Jan. 31, 1939.   A. P. BALL   2,145,642
VEHICLE BODY
Filed March 16, 1936   5 Sheets-Sheet 1
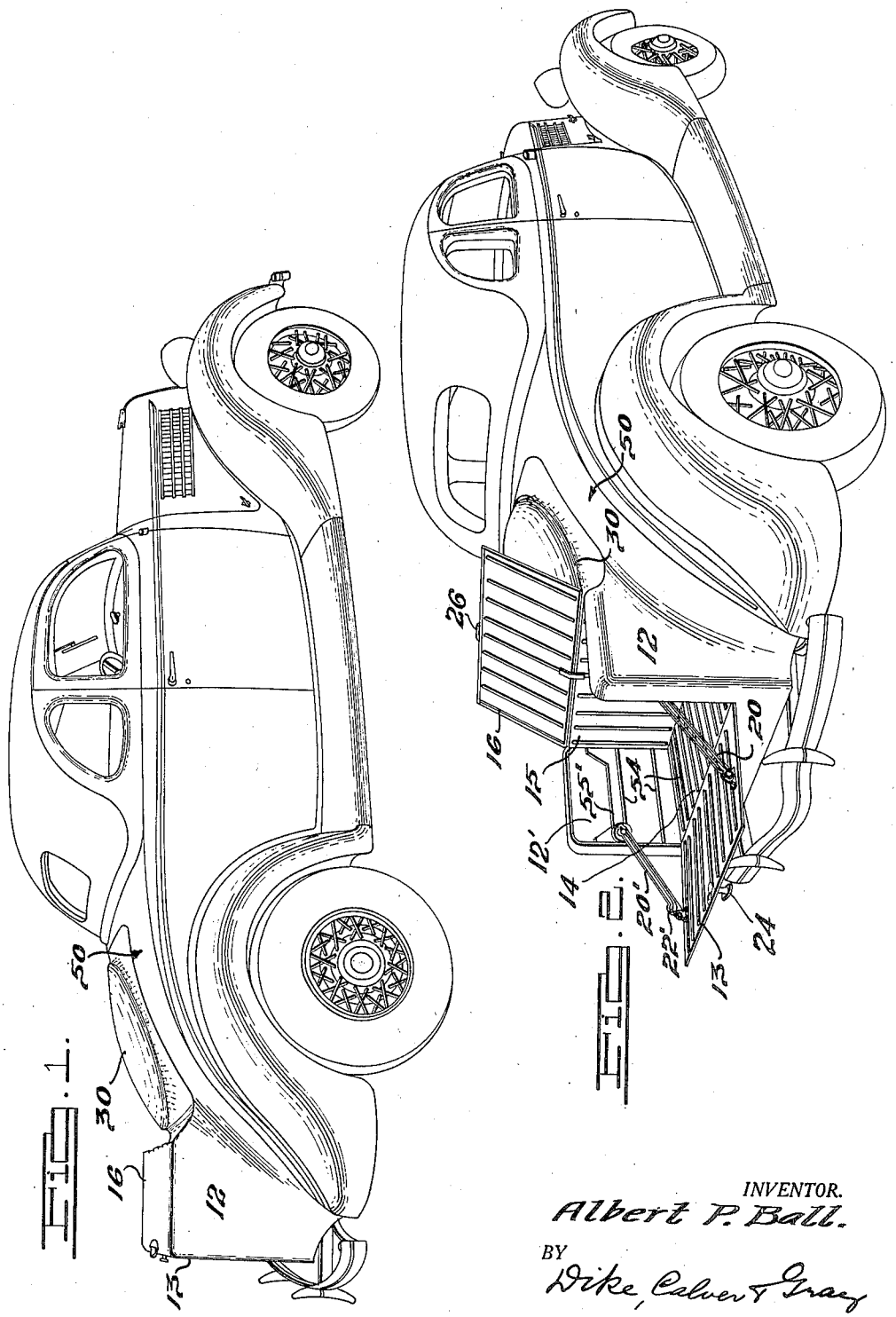
INVENTOR.
Albert P. Ball.
BY
Dike, Calver & Gray
ATTORNEYS.

Jan. 31, 1939.  A. P. BALL  2,145,642
VEHICLE BODY
Filed March 16, 1936   5 Sheets-Sheet 2

INVENTOR.
Albert P. Ball.
BY
Dike, Calver & Gray
ATTORNEYS.

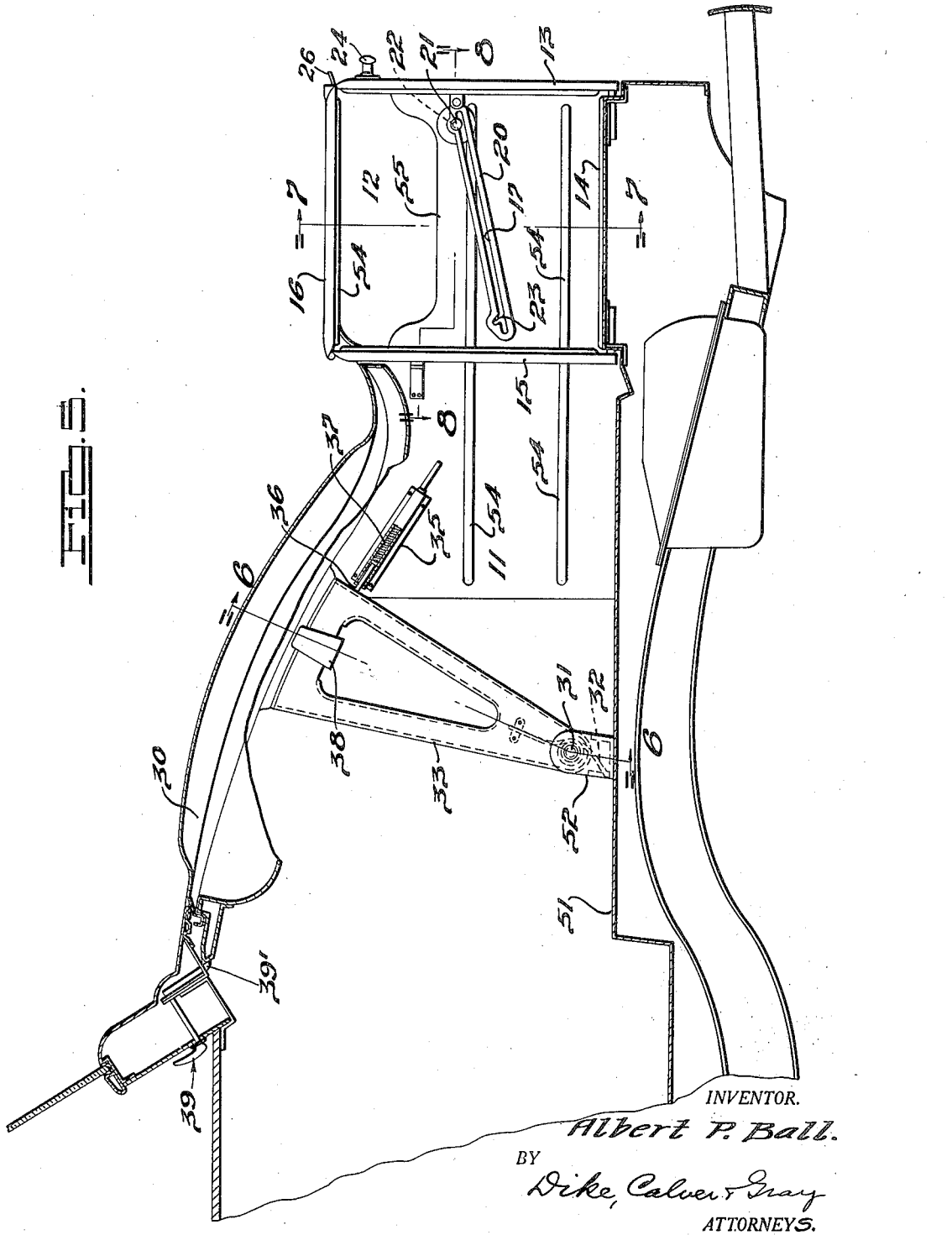

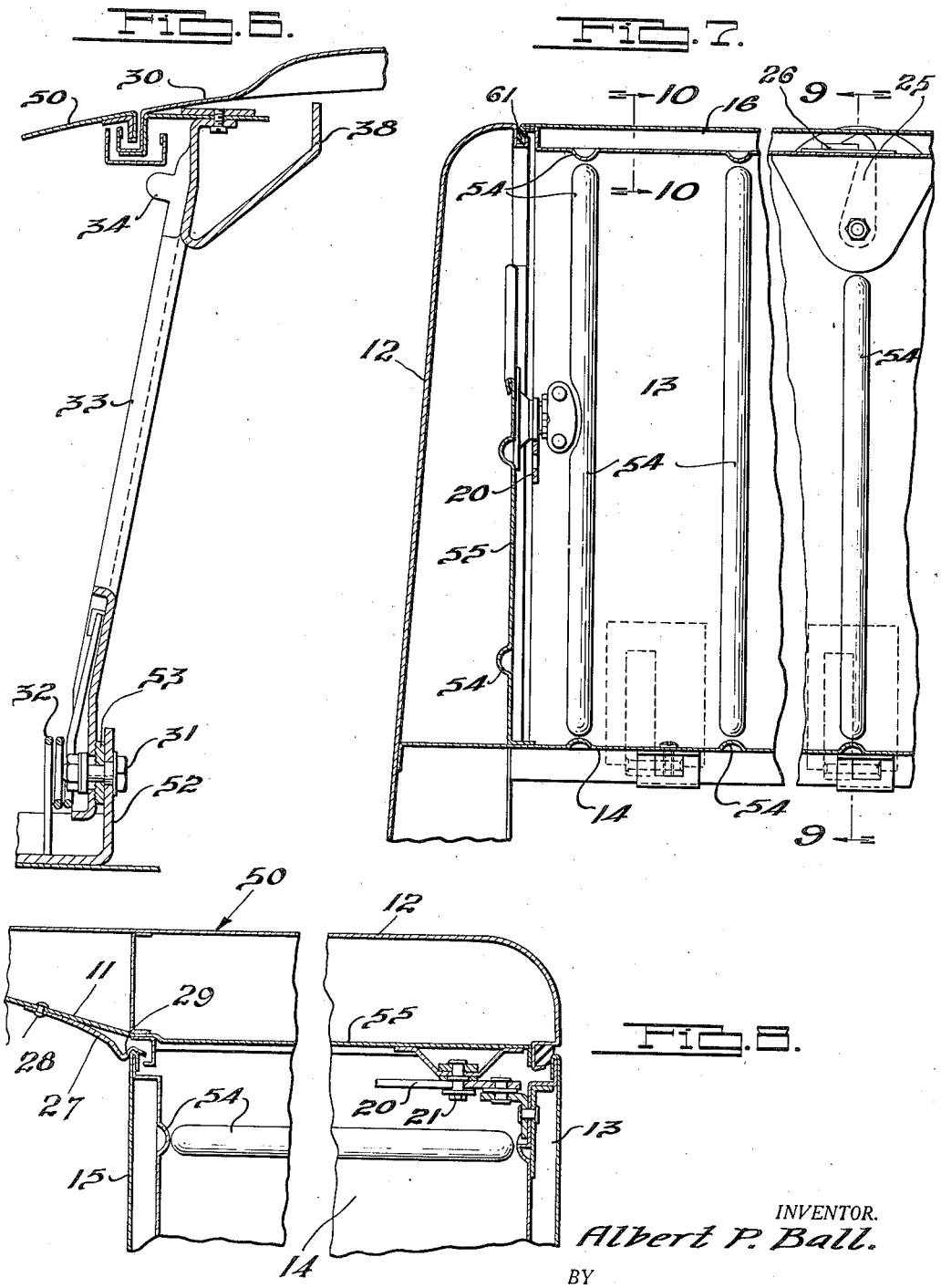

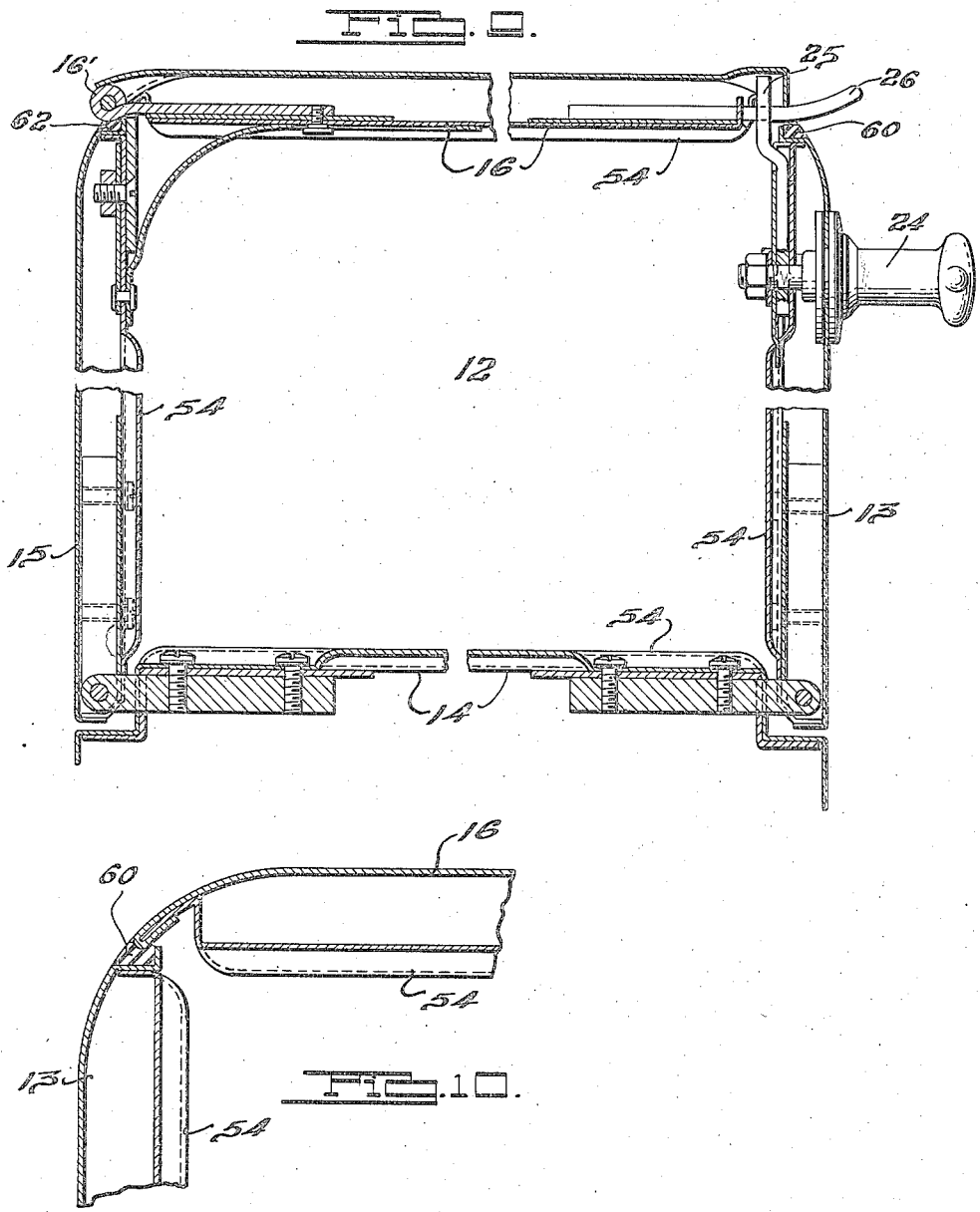

Patented Jan. 31, 1939

2,145,642

UNITED STATES PATENT OFFICE 2,145,642

VEHICLE BODY

Albert P. Ball, Detroit, Mich., assignor to Briggs Manufacturing Company, Detroit, Mich., a corporation of Michigan Application March 16, 1936, Serial No. 69,153

7 Claims. (Cl. 296—24)

This invention relates to vehicle bodies and more particularly, though not exclusively, to automobile bodies of the convertible type.

Heretofore, numerous attempts have been made to provide an automobile which, while possessing all the advantages of a pleasure car of conventional appearance, would be capable of being easily converted into a delivery wagon or a light truck, or which would be capable of accommodating a reasonable quantity of goods or baggage. The foregoing objects were sought to be attained by providing boxes or separable attachments, trunks of the ordinary and extensible type, and so on. Extensible trunks were made and supported on special platforms or racks behind cars and extending rearward in some designs, and forward into car bodies in other designs. Considerable difficulties have been experienced with such constructions. Separate boxes and attachments were difficult to handle and inconvenient to store when removed from the body. An ordinary trunk attached at the rear of a car could perform its ordinary functions, but could not operate to convert the car into a light delivery truck. Such trunk, when made to extend rearwardly for the purpose of increasing the load carrying capacity of the car, and when in its extended position, increased the length of the car to such an extent as to make the car not only inconvenient to handle, but actually unsafe in traffic; moreover, the space behind the passenger compartment of the car was not utilized.

Trunks made to extend toward the front and into the car body were placed in the above mentioned designs at some distance from the rear of the car on special racks or platforms, and executed in the form of separate convertible structures coacting with the car body. Such constructions eliminated the possibility of having spare tire holding means in their usual place at the rear of the car without providing any other practical position for the same. The unused space between the rear of the body and the trunk structure was objectionable. Dirt and dust would easily accumulate in this space and it would be very difficult to clean. Furthermore, said space provided a region of additional air turbulences at high speeds, greatly increasing the air resistance of the car and, consequently, considerably decreasing the maximum speed attainable as well as increasing the fuel consumption of the car at all speeds. Such constructions were also objectionable from the manufacturer's standpoint, since they were characterized by multiplicity of hinged sections in the trunk structure, up to eight in some of the designs, which made them not only expensive to manufacture but also difficult to operate and keep free from producing objectionable noises.

Accordingly, it is one of the objects of the present invention to provide a body for a pleasure vehicle, capable of accommodating a reasonable quantity of baggage and capable of being converted into a delivery wagon or a light truck body without the use of any separate attachments or structures, and without substantially increasing the length of the vehicle. Particularly, it is one of the objects of the invention to eliminate a separate trunk structure entirely, but to retain at the same time all of the advantages possessed by a car with a separate trunk.

Another object of the invention is to provide a body of the foregoing character having a rear deck comprising main and supplementary storage compartments in which the supplementary compartment is an integral part of the rear deck structure and in which the side walls of both compartments are unitary.

Another object of the invention is to provide a rear deck structure which is tightly sealed when closed to prevent the ingress of water and/or dust.

A further object of the invention is to decrease the air resistance of a vehicle by eliminating all outside structures usually placed at the rear thereof, and to make the vehicle easy to clean and wash.

A further object of the invention is to eliminate in a convertible body the objectionable multiplicity of moving parts, making the structure simple, secure, and easy and relatively inexpensive to manufacture.

The above and other objects and advantages of the invention will appear more fully hereinafter from a consideration of the detailed description which follows, taken together with the accompanying drawings wherein one preferred embodiment of the invention is illustrated.

In said drawings:

Fig. 1 is a perspective exterior view of an automobile with a body constructed in accordance with the invention.

Fig. 2 is a perspective view of the vehicle of Fig. 1 showing the supplementary storage compartment open.

Fig. 5 is a fragmentary longitudinal vertical sectional view, partly in elevation, of the car body when used for pleasure, showing the relation of the deck lid and the storage compartments when the rear deck is closed.

Fig. 6 is a transverse sectional view taken substantially along the line 6—6 of Fig. 5, looking in the direction of the arrows.

Fig. 7 is a fragmentary vertical transverse sectional view taken substantially along the line 7—7 of the Fig. 5.

Fig. 8 is a fragmentary horizontal longitudinal section taken substantially along the line 8—8 of Fig. 5, in the direction of the arrows.

Fig. 9 is a vertical longitudinal sectional view of the supplementary storage compartment when closed, taken substantially along the line 9—9 of Fig. 7, in the direction of the arrows; and Fig. 10 is a fragmentary longitudinal sectional view, on an enlarged scale, taken substantially along the line 10—10 of Fig. 7, looking in the direction of the arrows.

Figure 3:
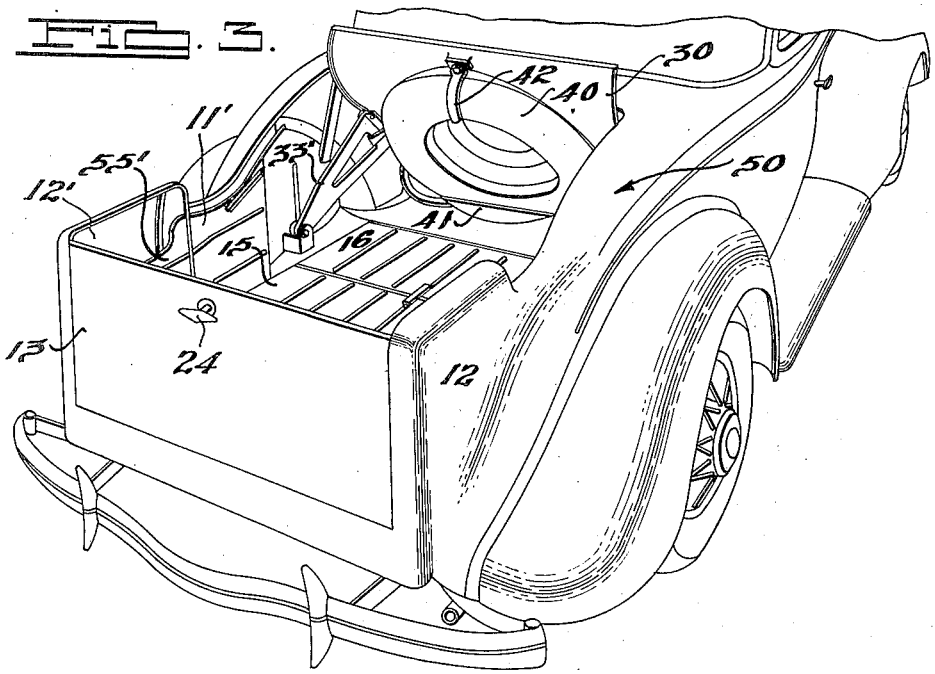
Fig. 3 is a perspective view of the rear deck of the vehicle of Figs. 1 and 2, with the body converted and the deck lid in full open position to receive articles of considerable height.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now to the drawings, the structure embodying the invention in the form shown represents a passenger automobile with a body of the coupe type having the usual passenger cabin. Behind the passenger cabin there is provided an enclosed rear deck section designated generally by the numeral 50. The rear deck provides a main storage compartment and a supplementary storage compartment which may be used separately but which are adapted to be opened and thrown together as a whole to provide one relatively large rear deck compartment which is unobstructed to permit easy loading. The side walls of the rear deck provide the side or end walls for both the main and supplementary compartments. The right and left hand end walls for the main compartment are shown at 11 and 11', respectively, and the right and left hand end walls for the supplementary compartment are shown at 12 and 12', respectively. The end wall of the supplementary compartment and the end wall of the main compartment at both sides of the rear deck section are unitary. That is to say, the end walls of the supplementary compartment are continuations or extensions of the side walls of the main compartment.

Figure 4:
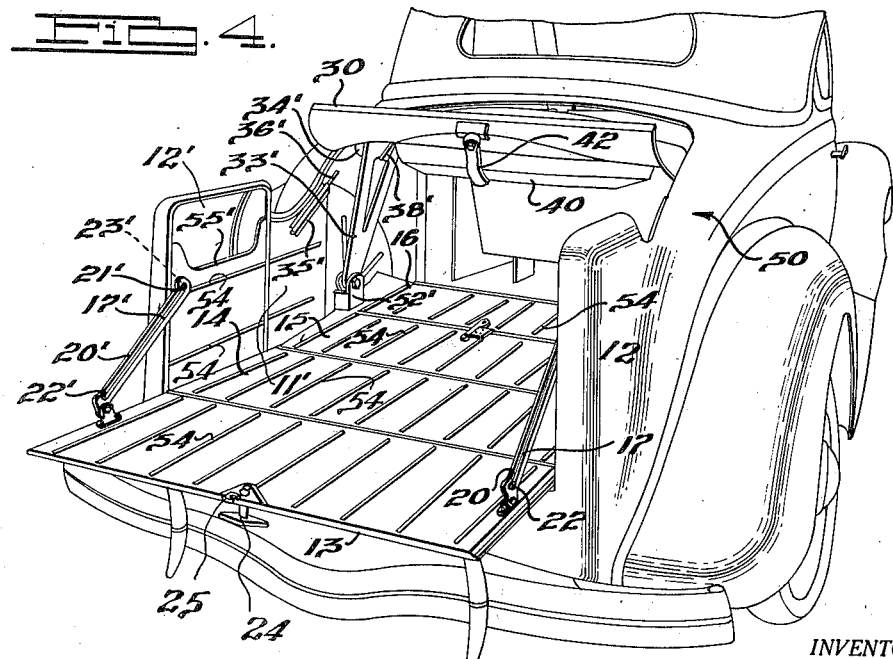
Fig. 4 is a view similar to that of the Fig. 3 with the deck lid and associated parts in position to receive articles of considerable length.

Referring particularly to Figs. 2 to 4 inclusive, the supplementary storage compartment comprises a rear wall or tail gate section 13, a bottom or intermediate section 14, a front wall or panel 15, a cover section 16 and the aforementioned end or side walls 12 and 12'. The tail gate section 13 and the front wall 15 are hingedly connected to the bottom section 14 and the cover section 16 is hingedly connected to the front wall section 15. In Fig. 2 the supplementary compartment is shown in open position ready to receive small articles, such as luggage. In Fig. 3 it is shown thrown open into the main compartment with the front wall 15 and the cover section 16 in horizontal position resting upon the floor of the main section and providing an auxiliary floor for that section. In this figure, the tail gate 13 is closed and the two compartments serve as one and are ready to receive articles of considerable height. In Fig. 4 the supplementary compartment is shown in completely knock-down condition, with the tail gate section 13 extending horizontally rearwardly and the sections 15 and 16 extending horizontally forwardly of the bottom section 14. The two compartments are thus combined to receive relatively long objects for transportation.

Means are provided for maintaining or locking the tail gate section 13 in either its open or closed positions. In the present embodiment such means are in the form of a pair of hinged pivoted links or brace bars 20 and 20' provided respectively, with longitudinal slots 17 and 17'. The end walls 12 and 12' of the supplementary storage compartment are provided with pins or studs 21 and 21' which engage in the slots 17 and 17' so that the links are slidable on the pins for a distance corresponding to the length of the slots. The link 20 is provided adjacent opposite ends with supplementary or branch slots 22 and 23. The link 21 is provided adjacent its opposite ends with corresponding branch slots 22' and 23'. The purpose of these slots is to catch the pins 21 and 21', thus locking the tail gate section 13 in either its open or its closed position. When the tail gate is closed, the links cannot be released unless the cover section 16 is opened. The tail gate section 13 and the cover section 16 are provided with cooperating locking means, there being a handle 24 for operating a swinging latch 25 carried by the tail gate section which is adapted to engage a keeper plate or member 26 (Figs. 5 and 7) carried by the cover section. Referring particularly to Fig. 8, it will be seen that the front wall 15 of the supplementary compartment is maintained in its upright or closed position against rattling by means of one or more friction stops or catches which engage the free edges of the wall 15, one such catch being shown at 27 in this figure. The catch, as shown, is in the form of a strip of spring-like metal secured to the compartment wall 11 by a rivet 28 and having an offset free end portion 29 which engages the edge of the wall 15. The catch member 27 will release the wall upon the application of sufficient pressure thereto.

The top of the rear deck section 50 is provided with a movable deck lid 30 which conforms to the upper surface line of the section. The deck lid is movably supported by a pair of substantially V-shaped brackets 33 and 33' closed at the top and provided with bent inward extensions 38 and 38' which project toward the center of the deck section and are turned upwardly at their ends as shown in Fig. 6. The lower ends of the brackets 33 and 33' are hingedly secured to channel-shaped base members or brackets 52 and 52' respectively, which are secured to the main floor 51 of the rear deck. The upper ends of the brackets are secured to the deck lid in any suitable manner and their lower ends are mounted upon pivot pins or bolts 31 and 31' carried by the base members. A friction washer, block or ring 53 is clamped between each of the supporting members 52 and 52' and the lower end of each of the swinging brackets 33 and 33'. Each friction block has a serrated face which engages the swinging bracket, and the supporting bolt 31 or 31' can be tightened or loosened to increase or decrease the friction between the parts. The purpose of the friction blocks is to maintain the deck lid 30 in any desired adjusted position, such for example, as the substantially horizontal position in which it is shown in Fig. 4. Springs 32 and 32' are located at the pivots 31, 31', respectively. One end of each spring is secured to the swinging bracket and the opposite end of the spring is preferably secured to the bracket supporting member 52 or 52'. These springs function to counterbalance the deck lid 30 inasmuch as it is hinged or pivoted below its center of gravity, and reduce the effort necessary to move the deck lid into its closed position.

The deck lid 30 is locked in its closed position by means of a latch 39' operated by a handle 39 located within the passenger cabin (see Fig. 5). When the deck lid 30 is in closed position, extensions or fingers 34, 34' formed on the brackets 33, 33', respectively (Fig. 6) are in engagement with a pair of push rods 36 and 36' carried by buffer members 35 and 35' secured to the right and left walls 11 and 11' of the main storage compartment. The push rods 36 and 36' are normally urged outwardly or forwardly of the buffer housings by means of springs 37 and 37'. When the deck lid is closed, the members 34, 34' engage the pins and compress the springs. When, however, the latch 39' is released from its engagement with the forward edge of the deck lid, the springs expand and force the deck lid and its swinging supporting brackets forwardly a short distance which is sufficient to permit the insertion of the hand to effect the further opening of the deck lid. The buffer members 35, 35' also provide anti-rattling devices to hold the deck lid in closed position rigidly against any possibility of rattling due to vibrations set up by operation of the vehicle. Thus it will be seen that the deck lid can be securely locked in closed position and cannot be opened until access is had to the latch operating handle 39 located within the passenger cabin. The buffers, therefore, perform a dual function of imparting initial opening movement to the deck lid and preventing rattling thereof when in closed position.

Referring particularly to Figs. 3 and 4, there is shown means for housing a spare tire within the deck lid 30. The tire 40 is preferably held in place beneath the deck lid by the metal bracket or sector 41 and a releasable clamp 42. The inwardly and upwardly extending free ends 38, 38' of the swinging lid supporting brackets 33 and 33' engage the side portions of the tire tread and prevent the tire from shifting sidewise. Thus the spare tire is supported at four separate points and held against shifting and rattling during any driving conditions.

The supplementary storage compartment or trunk portion of the rear deck is effectively sealed against the ingress of water and/or dust. The tail gate portion 13 is preferably provided on its top edge and both side edges with a sealing strip or strips 60 formed of compressible material. This strip or strips is engaged by the forward edge or lip of the cover 16 to seal the joint between these two parts. The portions of the strip along the side edges of the tail gate section engage adjacent edges of the walls 12 and 12' and effectively seal these joints. The rear deck at the wall portions 12 and 12', along the upper edges thereof, is provided with a trough for receiving and supporting a sealing strip 61 of compressible material, such as rubber, which is engaged by the side edges of the cover portion 16 to seal the parts at these joints. The forward wall or section 15 of the supplementary storage compartment, beneath the hinge 16', is provided with a sealing strip 62 of rubber or the like which provides a seal at the hinged joint between the members 15 and 16. Thus, all of the exposed joints of the supplementary storage compartment are sealed. The movable deck lid 30 and the adjacent portions of the rear deck surrounding it may be effectively sealed in any suitable and conventional manner.

With the parts in the positions shown in Figs. 1 and 5, the rear deck comprises two separate and distinct storage compartments. As shown in Fig. 3, the deck lid 30 has been moved into its forward position and the supplementary compartment cover 16 and front wall 15 have been swung forwardly into horizontal position to overlie the main floor 51 of the rear deck. The tail gate 13 is in its upright or closed position. Thus the two compartments are thrown into one and are capable of receiving and transporting articles of relatively great height.

In Fig. 4 the deck lid 30 has been moved into a substantially horizontal position overlying the forward portion of the floor of the rear deck. The supplementary storage compartment has been completely opened so that the front wall 15 and cover 16 overlie the main floor 51 and the tail gate 13 is in its extended horizontal position. As thus thrown together, the main and supplementary compartments provide an unobstructed space for receiving articles of considerable length. To reenforce the members or panels 13, 14, 15 and 16 and also to reduce friction of weighty articles as they are slid into and out of the combined compartments, each of these panels is provided on its exposed surface with a series of ribs or ridges 54. The end walls 12 and 12' of the supplementary storage compartment are provided with metal partitions 55 and 55' which are secured to the wall flanges and spaced inwardly from the main walls to provide separate additional compartments for the reception of small articles such as rags, etc. These partitions 55 and 55' are also provided on their exposed faces with reenforcing and friction reducing ribs 54. By securing the partitions to the inner edges of the flanges of the end walls 12 and 12', the interior of the supplementary storage compartment is made rectangular.

When it is desired to use the car as a pleasure vehicle, the tail gate 13 is moved from its horizontal position to its upright position, and the front wall 15 and the cover 16 are swung rearwardly so as to close the supplementary storage compartment as in Figs. 1 and 5. The deck lid 30 is swung rearwardly to close the main storage compartment and is held in such closed position by the latch 39'. While using the vehicle for pleasure purposes, the supplementary storage compartment may be used to carry luggage or other comparatively small articles.

I claim:

1. An automobile body having a main deck storage compartment provided with side walls, a movable lid therefor, a trunk compartment adjacent thereto comprising side walls fixed to the side walls of the main compartment and being integral uninterrupted extensions thereof, front and rear transverse upright walls and a trunk lid; the trunk lid being hinged to the front upright wall and the latter together with the trunk lid being extensible into substantially a common plane to provide a flooring and to convert said compartments into a single storage space.

2. In a vehicle body having in the rear thereof an enclosed deck section, a single transverse partition wall dividing said deck section into front and rear compartments and located at the juncture of said front and rear compartments, said wall being movable into position to form said front and rear compartments into a single storage compartment, a movable lid for the rear compartment, and a deck lid cooperating with said partition wall to close said front compartment and adjustable to a fixed substantially horizontal position overlying the front end of the storage compartment.

3. In a vehicle body having in the rear thereof an enclosed deck section, a single transverse partition wall dividing said deck section into front and rear compartments and located at the juncture of said front and rear compartments, said wall being hinged at the bottom thereof and adapted to be swung down upon the bottom of the front compartment to form said compartments into a single storage compartment, a movable lid for the rear compartment, and a swinging deck lid cooperating with said partition wall to close said front compartment.

4. An automobile body having a rear sloping deck forming a main storage compartment, a supplementary storage compartment in rear of said main compartment and having the upright side walls thereof formed as permanent integral uninterrupted extensions of the side walls of the main compartment and also having top and front walls extensible into the main compartment to convert said compartments into a single storage space, said front wall otherwise forming a transverse partition separating said compartments.

5. An automobile body having a rear sloping deck defining a main storage compartment, a supplementary storage compartment in rear thereof having enclosing walls separating the same from the main compartment and including top and front walls extensible into the main compartment to convert both compartments into a single storage space and also including side walls formed as integral uninterrupted extensions of the side walls of the main compartment, the rear wall of the supplementary compartment forming a tail gate.

6. An automobile body having a deck storage space, a single transverse partition separating said space into a main compartment and a supplementary compartment and being located at the junction of said compartments, a swinging lid for each compartment, said partition and said lids being shiftable within the storage space to convert said compartments into a single compartment, said main compartment lid being adapted when in one position to cooperate with said partition to form a completely closed compartment and being movable into a different position ineffective to obstruct the compartment.

7. An automobile body having a deck storage space, a transverse partition separating said space into a main compartment and a supplementary compartment, a swinging lid for each compartment, said partition and said lids being shiftable within the storage space to convert said compartments into a single compartment, one of said lids being movable into a position ineffective to obstruct the compartment and the side walls of the supplementary compartment being integral uninterrupted extensions of the side walls of the main compartment.

ALBERT P. BALL.